United States Patent [19]
Garrett et al.

[11] 3,871,492
[45] Mar. 18, 1975

[54] VEHICLE CHOCK

[75] Inventors: Kenneth John Garrett, Chesham; Ronald Denis Fox, Amersham, both of England

[73] Assignee: Humphrey Thompson Enterprises Limited, Middlesex, England

[22] Filed: Mar. 14, 1973

[21] Appl. No.: 341,090

[30] Foreign Application Priority Data
Mar. 15, 1972 Great Britain.................. 12096/72

[52] U.S. Cl. .................................................. 188/32
[51] Int. Cl. .............................................. B60t 3/00
[58] Field of Search...................... 188/4 R, 32, 36

[56] References Cited
UNITED STATES PATENTS

| | | | |
|---|---|---|---|
| 1,035,381 | 8/1912 | Moss.................................... | 188/32 |
| 1,276,430 | 8/1918 | Smith................................... | 188/32 |
| 1,746,415 | 2/1930 | Burkart................................. | 188/32 |
| 2,237,214 | 4/1941 | Burkart................................. | 188/32 |
| 2,723,005 | 11/1955 | Wink.................................... | 188/32 |

Primary Examiner—Duane A. Reger
Attorney, Agent, or Firm—Fleit & Jacobson

[57] ABSTRACT

A chock for a vehicle wheel comprising a first plate, having a series of swayed down peripheral portions of a series of holes, to grip a roadway, a second, flexible, plate welded at one end to said first plate, and a pin engageable in a hole at the other end of each plate, to deform the flexible plate to a curved shape, which conforms to the shape of a vehicle wheel. The pin can be removed and the chock flattened to a folded condition, with the pin then being placed in a slot in the flexible plate.

8 Claims, 3 Drawing Figures

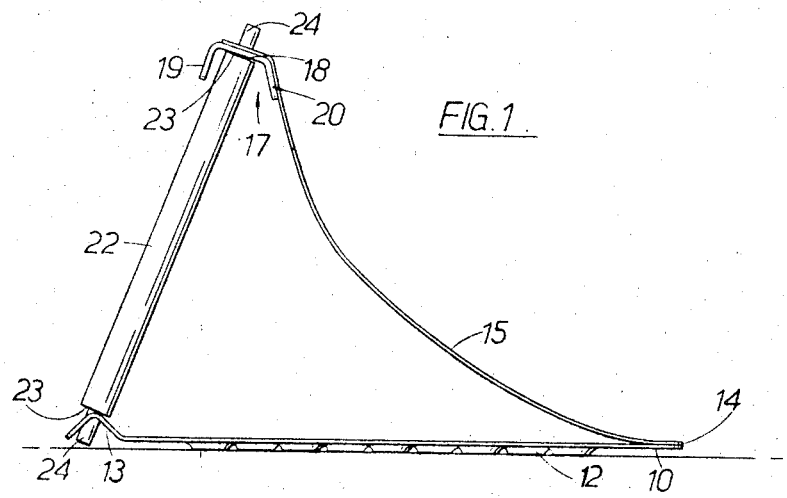
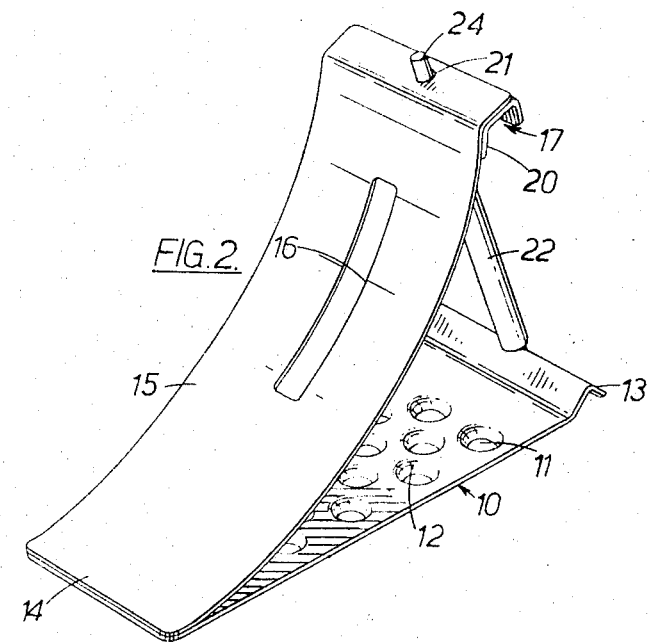
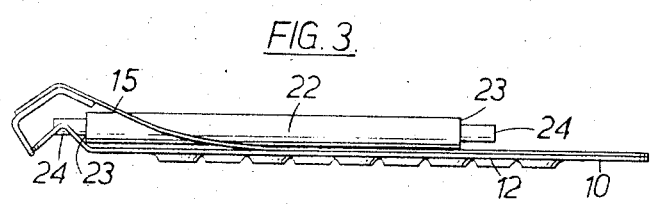

VEHICLE CHOCK

The present invention relates to chocks.

Various forms of chock have been proposed to prevent vehicles, such as motor cars, from moving when the handbrake is off and the vehicle is not in gear. The most conventional form of chock is a block of wood cut in isosceles right angle triangle form, the wheel bearing against the hypotenuse side which extends at an angle of 45° to the other two sides. Such a construction has two main disadvantages. Firstly, there is a tendency for the chock to be moved along the direction of roll of the wheel and secondly, the chock is an extremely bulky article.

It is now proposed, according to the present invention, to provide a chock which comprises a first plate, and a second plate overlying said first plate, the two plates being secured together at one end, the second plate being formed of a flexible material and a member being provided to space the other end of the two plates apart, when in use.

In a preferred construction, the two plates are secured together by welding at the one end and at the other end the second flexible plate is provided with a reinforcement, for example in the form of an angle iron or channel section member. The first or lower plate is preferably made of a more robust material which is not capable of flexing and is provided with means to support said member and prevent collapse thereof. This may be in the form of an inverted V-section channel having an aperture therein to accommodate the end of the member. The member is preferably a pin which is preferably provided with a shoulder at its upper end, the neck portion, which extends above the shoulder, passing through an aperture in the upper plate and, where provided, in the reinforcing member. At its lower end the pin is so shaped as to pass through an aperture in the first or lower plate so as to engage on the roadway.

In order to assist in the grip between the first or lower plate and the roadway on which the chock is to be used, this first plate is preferably provided with a plurality of downwardly projecting elements. These elements may be formed by punching a series of holes in the lower plate and swaging down the peripheries of these holes. This may be effected in a two-part press operation. The downwardly projecting swaged portions serve firstly to engage and bite into the roadway and secondly to provide a reinforcement preventing buckling of the plate about a transverse axis. Preferably the holes and swaged portions are so arranged that there is no straight line extending transversely, perpendicular to the direction of length of the first plate, which does not pass through one of the swaged down portions.

With the construction of the present invention, in use, the vehicle rides on to the two plates, at said one end, forcing said one end into engagement with the roadway. The upper flexible plate then distorts to a curved form to conform to the periphery of the tyre of the vehicle. This causes downward pressure of the pin onto the roadway, the pin being so disposed that it does in fact itself engage the roadway. The chock can readily be disassembled, by removal of the pin, and in a preferred arrangement, the upper plate is provided with a slot in which the pin may be passed. In the folded up condition, the reinforcement preferably constitutes a catch to retain the other ends of the two sheets in engagement, this latch mechanism being readily releasable. It will be appreciated that in the folded condition the construction of the present invention is extremely compact and in a preferred construction is of the order of 9 inches long, 3 inches wide and three-fourths of an inch high. This can readily be disposed in the boot of a vehicle without taking up any undue amount of space.

In order that the invention may be more readily understood, the following description is given, merely by way of example, reference being made to the accompanying drawings, in which:

FIG. 1 is a side view of one embodiment of chock according to the invention, in the assembled condition;

FIG. 2 is a perspective view of the chock of FIG. 1; and

FIG. 3 is a side view of the chock in the folded up state.

Referring now to the drawings, there is illustrated one embodiment of chock according to the invention and this comprises a lower plate 10 of mild steel construction, in this lower plate are punched holes 11 and in a further operation of a punching press the peripheries of these holes are swaged downwardly to form annular teeth 12. At the left hand end, as seen in FIG. 1, the lower plate 10 is provided with an inverted V-form channel 13 having a central aperture therein.

At the other end 14, there is secured, by spot welding, to the upper surface of the plate 10, a second plate 15, made of flexible material. This plate may in fact be constructed of a material such as spring steel suitably annealed, and is of substantially the same length and width as the plate 10 and has formed, longitudinally therein, a slot 16.

At the other end, remote from the welded end, the upper flexible plate 15 is reinforced by a channel section member 17 welded by its web portion 18 and having a downwardly projecting flange 19 and an angled flange 20. This angled flange 20 is also suitably spot welded to the adjacent portion of the flexible plate so that the latter is bent around two sides of the channel. A central aperture 21 is formed in the flexible plate and through the web of the channel.

In the assembled condition, a pin 22 having a shoulder 23 with a neck portion 24 at each end is arranged so that it passes through the hole in the channel 13 and the hole 21. The shoulder thus serves to support the plate 15 in this position and the length of the neck 24 is sufficient for it to engage the roadway when passed through the aperture in channel 13.

The thus assembled construction is placed on the appropriate side of the wheel of a vehicle and the latter is allowed to move so that it engages onto the upper plate 15. The welded portion 14 is the first portion to engage under the periphery of a wheel tyre and this has the effect of forcing the adjacent portion of the plate 10 into engagement with the roadway. Any further movement to the left, as viewed in the FIG. 1, causes the plate 15 to flex to a shape such that it conforms closely to the periphery of the wheel, regardless of the radius of curvature of the wheel.

The further weight imposed on the flexible portion 15 forces the pin 22 downwardly so that the lower neck portion 24 engages the road. The lower shoulder 23 also forces the inverted channel section portion 13 downwardly, thus pressing the full length of the lower plate 10 firmly downwardly into engagement with the road. The annular teeth 12 serve to dig into the road and give a strong resistance to slipping.

The annular teeth 12 also serve to rigidify the bottom portion or plate 10 and if those are so disposed, as shown, so that there is no lateral straight line perpendicular to the length of the lower plate which does not pass through one of these annular teeth, then an effective strengthening is achieved preventing buckling.

A construction as illustrated and described has been tested with a heavy saloon motor car, weighing approximately 1½ tons, on a concrete roadway having a slope of 1 in 3 and the chock was found able to withstand the force without any buckling and without any slippage. It will be appreciated that the construction of the present invention is particularly suitable for chocking one wheel of a vehicle while the other wheels on the other side are being jacked up to effect a repair of some sort. This is particularly important when the jacking is required when the vehicle is on a sloping roadway.

When one has finished using the chock, then by driving the vehicle off the plate to the right, the whole chock assembly can be removed and the upper plate 15 can be flexed away from the lower plate allowing the pin 22 to be disengaged. The upper plate 15 can be pressed downwardly, to the position shown in FIG. 3, so that the bottom lip of the flange 19 engages over the edge of the inverted V-channel 13 and acts as a releasable catch, the resilience of the plate 15 permitting this to occur. The pin 22 can then be inserted through the slot 16 to complete the folded up assembly. This assembly is extremely compact and can readily be stowed in the boot of a vehicle without taking up any undue space.

It will be appreciated that many variations are contemplated according to the invention. For example, the pin instead of being provided with shoulders at both ends can be provided with a taper at one or both ends. The actual formation on the lower plate 10 to assist in gripping can be varied substantially by providing other forms of serration on the bottom face. Furthermore, the bottom tread can be rigidified by other forms of strengthening reinforcement. The construction illustrated is, however, to be preferred because of its simplicity and ease of manufacture. The flexible plate may be formed of any suitable flexible material, e.g., metal, wood, reinforced plastics material or webbing, provided that it is sufficiently strong.

We claim:

1. A chock for a vehicle wheel comprising, in combination:
   a. a first substantially rigid plate engageable with a roadway;
   b. a second flexible plate overlying the first plate;
   c. first and second ends to each of said plates;
   d. means securing said plates together at said first ends;
   e. an inverted V-section channel extending transversely of said first plate at the second end thereof;
   f. means defining an aperture in said inverted V section channel;
   g. a removable pin of a size to pass through the aperture in said inverted V section;
   h. a shoulder formed in said pin near the upper end thereof to define a neck portion;
   i. means defining an aperture in said second end of said second plate to receive said neck portion.

2. A chock as claimed in claim 1, wherein the first plate includes a plurality of downwardly projecting elements in the form of swaged down portions arranged so that every straight line extending transversely, perpendicularly to the direction of length of the first plate, passes through at least one of the swaged down portions.

3. A chock as claimed in claim 2, wherein the swaged down portions are the peripheral portions defining a series of apertures in said first plate.

4. A chock as claimed in claim 1, and further comprising an inverted channel section reinforcement extending transversely of said second plate at said second end thereof, a web portion and two flange portions of said inverted channel section reinforcement, and weld means securing said web portion and one of said flange portions to said second plate.

5. A chock as claimed in claim 4, wherein said inverted channel section reinforcement and said inverted V-section channel are positioned to resiliently engage one another, effective to provide a releasable catch to retain said chock in a folded condition.

6. A chock as claimed in claim 5, and further comprising means defining a slot in said second plate, through which the pin may pass when the chock is in the folded condition.

7. A chock for a vehicle wheel comprising in combination:
   a. a first substantially rigid plate engageable with a roadway;
   b. a second flexible plate overlying the first plate;
   c. first and second ends to each of said plates;
   d. means securing said plates together at said first ends;
   e. a removable member spacing the second end of the second plate away from the second end of the first plate; and
   f. a plurality of downwardly projecting elements on said first plate to grip a roadway in the form of swaged down portions of said first plate arranged so that every straight line extending transversely, perpendicularly to the direction of length of the first plate passes through at least one of the swaged down portions.

8. A chock as claimed in claim 7, wherein the swaged portions comprise the swaged down peripheral portions of holes punched in the first plate.

* * * * *